United States Patent [19]

Shell et al.

[11] Patent Number: 5,165,477
[45] Date of Patent: Nov. 24, 1992

[54] ENZYMATIC DECOMPOSITION OF DRILLING MUD

[75] Inventors: Francis J. Shell; Donald O. Hitzman, both of Bartlesville, Okla.

[73] Assignee: Phillips Petroleum Company, Bartlesville, Okla.

[21] Appl. No.: 865,117

[22] Filed: Apr. 8, 1992

Related U.S. Application Data

[62] Division of Ser. No. 631,936, Dec. 21, 1990, Pat. No. 5,126,051.

[51] Int. Cl.$^5$ .................. E21B 33/16; E21B 37/00
[52] U.S. Cl. .................. 166/291; 166/300; 166/312; 252/8.552
[58] Field of Search ............ 166/291, 300, 302, 305.1, 166/312; 252/8.551, 8.552

[56] References Cited

U.S. PATENT DOCUMENTS

| | | | |
|---|---|---|---|
| 2,343,136 | 2/1944 | Dobson et al. | 166/312 X |
| 2,602,778 | 7/1952 | Snyder et al. | 252/8.55 |
| 2,651,500 | 9/1953 | Teichmann | 255/1.8 |
| 2,681,704 | 6/1954 | Menaul | |
| 2,801,218 | 7/1957 | Menaul | 252/8.55 |
| 2,807,570 | 9/1957 | Updegraff | 195/3 |
| 3,288,211 | 11/1966 | Johnston | |
| 3,634,227 | 1/1972 | Patterson | 210/11 |
| 3,635,797 | 1/1972 | Battistoni | 195/56 |
| 3,684,710 | 8/1972 | Cayle et al. | 252/8.55 |
| 4,039,028 | 8/1977 | Knight | 166/246 |
| 4,414,334 | 11/1983 | Hitzman | 435/262 |
| 4,450,908 | 5/1984 | Hitzman | 166/246 |
| 4,474,240 | 10/1984 | Oliver, Jr. et al. | 166/312 |
| 4,609,475 | 9/1986 | Hanlon et al. | 166/312 X |
| 4,940,539 | 7/1990 | Weber | 210/632 |

OTHER PUBLICATIONS

Bulletin issued by the American Petroleum Institute entitled "Oil and Gas Well Drilling Fluid Chemicals", API Bul. 13F (1st Ed. Aug. 1978).

*Primary Examiner*—George A. Suchfield
*Attorney, Agent, or Firm*—Laney, Dougherty, Hessin & Beavers

[57] ABSTRACT

Drilling mud is rapidly decomposed by admixing one or more enzymes with the mud to selectively degrade one or more polymeric organic viscosifiers therein. A method of cleaning up a well site drilling mud pit containing drilling mud is provided. Also provided are a composition and method of removing residual drilling mud from a wellbore and around the well face.

18 Claims, No Drawings

ENZYMATIC DECOMPOSITION OF DRILLING MUD

This is a division of copending application Ser. No. 07/631,936 filed on Dec. 21, 1990, now U.S. Pat. No. 5,126,051.

BACKGROUND OF THE INVENTION

A. Field of The Invention

This invention relates in general to compositions and methods for decomposing drilling muds. In one aspect, the invention relates to compositions and methods for cleaning up well site drilling mud pits. In another aspect, the invention relates to compositions and methods for removing residual drilling muds from subterranean formations and/or wellbores.

B. Description of The Prior Art

Drilling mud is an essential part of most oil and gas drilling operations. The mud is continuously circulated down through the drill pipe, out through the drill bit and back to the surface through the annulus between the drill pipe and the wall of the bore or casing. The mud serves to lubricate and cool the drill bit as the bit breaks up rock at the bottom of the hole and carries the cuttings to the surface. The mud also helps control pressures that exist in formations penetrated by the drill bit, stabilizes the hole and serves as a valuable source of downhole information.

When drilling mud returns to the surface, it is typically conducted over a shale shaker where relatively large drill cuttings are removed. These large drill cuttings are placed in a shale pit. The mud is then conducted into a settling pit where a portion of finely ground rock (silt) in the mud is deposited. After possibly being run through one or more other solids removal or "working" pits, the mud is pumped back into the well through a suction pit. Fresh chemicals are typically added to the mud while it is in the suction pit. Water can be added to the mud both at the shale shaker and in the suction pit.

On most rigs, a large volume of drilling mud and other material is discarded into one or more "reserve" pits. The mud and material in the reserve pit(s) are kept for use if needed to prevent lost circulation or fight a blow out, etc. During the drilling process, solid material that builds up in the working pits is cleaned out by jetting the pits. Because water is continuously added to the mud, the volume of mud on hand increases and becomes excessive. The excess mud is often used to clean out the working pits. The solids-laden mud from the cleaning process is typically pumped into the reserve pit(s). On some rigs, rig wash water and other run-off material is also deposited in the reserve pit(s). Depending on the location and type of operation, drilling mud remaining at completion of the well is also pumped into the reserve pit(s). The primary solids in a reserve pit are drilled solids. In addition, a reserve pit will typically contain a significant portion of solids that are part of the original mud itself, particularly if the mud is a weighted mud. At the conclusion of the drilling operation, the agglomeration of mud and other materials in the reserve pit(s) must be disposed of so that the well site can be restored to a proper condition.

Most drilling muds typically contain one or more natural and/or synthetic polymeric additives including polymeric additives that increase the rheological properties (e.g., plastic viscosity, yield point value, gel strength) of the drilling mud (hereinafter called "polymeric organic viscosifiers") and polymeric additives that do not increase the rheological properties of the mud such as thinners and flocculents. Polymeric organic viscosifiers are employed for many purposes. For example, polymeric organic viscosifiers are employed to impart sufficient carrying capacity and thixotropy to the mud to enable the mud to transport the cuttings up to the surface and to prevent the cuttings from settling out of the mud when circulation is interrupted. Polymeric organic viscosifiers are also employed to limit fluid loss to the formation and to prevent an excessive filter cake from forming on the wall of the bore. Most of the polymeric organic viscosifiers employed in drilling mud are highly resistant to biodegration. This extends the utility of the additives for the useful life of the mud.

Unfortunately, the resistance of drilling mud polymeric organic viscosifiers to biodegration causes many problems. Polymeric organic viscosifiers make it very expensive and cumbersome to dispose of the agglomeration of drilling mud and other materials in reserve pit(s) in an environmentally safe manner. Typically, between 5,000 and 50,000 barrels of solids-laden mud and other materials have accumulated by the end of a drilling operation. In some drilling operations, as much as 100,000 barrels of mud may remain after the well is completed. The polymeric organic viscosifiers inhibit flocculation and prevent accumulated solids from settling out of the mud. As a result, special solids separation equipment such as decanter centrifuges, cyclone separators, fine screen "rumba" shakers and the like is usually required to separate the solids from the water phase of the mud. This type of separation equipment typically involves dilution of the mud creating even more water that must be disposed.

In addition, polymeric organic viscosifiers remaining in the well tend to interfere with other phases of drilling and completion operations such as cementing the casing to the wall of the bore as well as optimum oil and gas production after the drilling operations are complete. As the bore is initially drilled, fluid from the mud tends to seep into the surrounding earth forming a filter cake on the wall of the bore. This filter cake can prevent casing cement from properly bonding to the wall of the bore. The trajectory of a wellbore is generally tortuous. The wall of the bore often has various ledges and cavities therein which contain thixotropic drilling mud that comes into contact therewith. The drilling mud in contact with the bore wall is quiescent while the casing is lowered into the bore and tends to gel. When circulation is resumed, the fluid pumped through the casing and up through the annulus between the casing and the bore wall makes paths or channels or even bypasses the "gelled" mud contained by the ledges and cavities.

Cement pumped through the casing and up through the annulus to cement the casing to the bore wall flows through the paths or channels in the mud leaving large pockets of mud between the casing and the bore wall. These pockets can ultimately result in fluid communication with formation zones that the cement is supposed to isolate. In an attempt to solve this problem, special fluids are often circulated through the annulus between the casing and the wall of the bore before the casing is cemented to remove mud remaining therein. Unfortunately, this procedure, often referred to as a "spacer" flush, is inadequate in many applications. Conventional flushing fluids are not always capable of sufficiently decreasing the gel strength, viscosity and other rheological properties of the mud caused by polymeric organic viscosifiers therein. As a result, the mud cannot be flushed out of the well. Instead, expensive squeeze cementing operations are carried out to fill in the gaps in the cement caused by the mud.

Furthermore, the hydrostatic head pressure created by the mud may fracture the formation resulting in lost circulation, i.e., the flow of whole mud into portions of formations penetrated by the drill bit adjacent the wall of the bore. Residual mud remaining around the well face in a producing formation can impede the flow of oil and/or gas to the wellbore. Polymeric organic viscosifiers in the mud tend to tie up other mud components rendering residual drilling mud around the well face nondispersible by water and other fluids and incapable of being removed by conventional flushing techniques.

SUMMARY OF THE INVENTION

The present invention provides compositions and methods for decomposing drilling mud. In accordance with the invention, one or more enzymes are admixed with the drilling mud to selectively degrade one or more polymeric organic viscosifiers therein.

In one aspect, the present invention provides a composition and method for cleaning up a well site drilling mud pit containing drilling mud, the drilling mud being of the type comprising solid materials including at least one polymeric organic viscosifier and water. The method of this aspect of the invention comprises the steps of admixing an enzyme capable of enzymatically degrading the polymeric organic viscosifier with the drilling mud to degrade the polymeric organic viscosifier, and allowing settleable solid materials remaining in the drilling mud to settle in the mud pit from the water.

In another aspect, the present invention provides a composition and method for removing residual drilling mud of the type comprising solid materials including at least one polymeric organic viscosifier from a well including the wellbore and/or portions of formations adjacent thereto (the well face). The method of this aspect of the invention comprises the steps of injecting a well treatment fluid comprising an enzyme capable of rapidly enzymatically degrading the polymeric organic viscosifier into the well, and allowing the enzyme to degrade the polymeric organic viscosifier and the well treatment fluid to disperse the residual drilling mud. The well treatment fluid and residual drilling mud are preferably then recovered from the well. In one embodiment, the method of this aspect of the invention comprises an improvement to a method of drilling a well wherein a drill bit is advanced into the earth to form a bore therein, the drill bit is withdrawn from the bore, annular well casing having an outside diameter less than the diameter of the bore is placed in the bore and cement is placed between the wall of the bore and the casing. The improvement comprises prior to placing the cement between the wall of the bore and the casing, injecting a well treatment fluid into the well to remove residual drilling mud of the type comprising solid materials including at least one polymeric organic viscosifier therefrom, the well treatment fluid comprising an enzyme capable of rapidly enzymatically degrading the polymeric organic viscosifier, and allowing the enzyme to degrade the polymeric organic viscosifier and the well treatment fluid to disperse the residual drilling mud. The well treatment fluid and residual drilling mud are preferably then recovered from the well.

It is, therefore, an object of the present invention to provide compositions and methods for decomposing drilling muds.

It is an object of the present invention to provide compositions and methods for rapidly decomposing used drilling muds by selectively degrading one or more polymeric organic viscosifiers therein.

It is also an object of the present invention to provide an easy and inexpensive method of cleaning up a well site drilling mud pit containing drilling mud of the type comprising various polymeric organic viscosifiers.

A further object of the present invention is to provide a composition and method for facilitating various steps of the drilling process and increasing oil and gas production after the well is complete.

Other and further objects, features and advantages of the present invention will be readily apparent to those skilled in the art upon a reading of the following description of the preferred embodiments including the examples provided therewith.

DETAILED DESCRIPTION OF THE PREFERRED EMBODIMENTS

The present invention provides compositions and methods for decomposing drilling muds including drilling muds that have accumulated in well site drilling mud pits and used or residual drilling muds remaining in contact with the wellbore or in portions of formations adjacent thereto (the well face). In accordance with the invention, drilling mud is decomposed by admixing one or more specific enzymes with the mud to selectively degrade one or more polymeric organic viscosifiers therein. The enzymes rapidly decompose drilling mud in contact with the wellbore or in portions of formations adjacent thereto before they are rendered inactive by harsh downhole conditions. Enzymatic treatment compositions can be tailored to particular drilling muds and/or specific polymeric organic viscosifiers therein. Alternatively, enzymatic treatment compositions can be formulated for particular types or categories of drilling muds and/or specific polymeric organic viscosifiers common to typical drilling muds.

As used herein and in the appended claims, "used" drilling mud means drilling mud that has been circulated through the well and placed in a mud pit, or drilling mud or residual drilling mud remaining in contact with the wellbore or in portions of formations adjacent thereto (the well face). A "mud pit" means a pit excavated adjacent the well or other container for mud and other materials. "Rapidly" decomposed or degraded means substantially decomposed within about 60 minutes. Polymeric organic viscosifier means a compound that increases the plastic viscosity, yield point value and/or gel strength of drilling mud.

Natural and synthetic polymeric organic viscosifiers are employed in drilling mud for a variety of purposes. Examples of specific biodegration resistant polymeric organic viscosifiers employed include biopolymers such as xanthans (xanthan gum), various acrylic based polymers such as polyacrylamides and other acrylamide based polymers, cellulose derivatives such as dialkylcarboxymethylcellulose, hydroxyethylcellulose and the sodium salt of carboxymethylcellulose, polysaccharides, guar gum, phosphomannans, scerolglucons, glucans, and dextrans.

The specific enzymes admixed with the drilling mud to alter and degrade the polymeric organic viscosifiers therein in accordance with the present invention are selected to correspond to the particular polymeric organic viscosifiers. Because of the harsh chemicals and conditions associated with used drilling mud, particularly drilling mud in contact with the wall of the bore or around the well face, it is important for the enzymes selected to be capable of rapidly degrading the polymeric organic viscosifiers, at least in downhole applications.

A variety of enzymes are effective for a variety of polymeric organic viscosifiers. It is often advantageous to use a mixture of enzymes in connection with the present invention. Drilling mud often includes a variety of polymeric organic viscosifiers. In most applications, the cost of the enzymes is an important consideration. Crude enzyme preparations are usually the cheapest. Such enzyme preparations are also desirable because they typically include a mixture of enzymes.

Thousands of enzymes have been identified and separately classified. A detailed description and classification of known enzymes is provided in the reference entitled *Enzyme Nomenclature* (1984): *Recommendations of the Nomenclature Committee of the International Union of Biochemistry on the Nomenclature and Classification of Enzyme-Catalysed Reactions* (Academic Press 1984) (hereinafter referred to as "*Enzyme Nomenclature* (1984)"), the disclosure of which is fully incorporated by reference herein. According to *Enzyme Nomenclature* (1984), enzymes can be divided into six classes, namely (1) Oxidoreductases, (2) Transferases, (3) Hydrolases, (4) Lyases, (5) Isomerases, and (6) Ligases. Each class is further divided into subclasses and by action, etc. Although each class may include one or more enzymes that will degrade one or more polymeric organic viscosifiers present in drilling mud, the classes of enzymes in accordance with *Enzyme Nomenclature* (1984) most useful in the methods of the present invention are (3) Hydrolases, (4) Lyases, (2) Transferases, and (1) Oxidoreductases. Of the above, classes (3) and (4) are the most applicable to the present invention.

Examples of good enzymes within classes (1)–(4) according to *Enzyme Nomenclature* (1984) for use in accordance with the methods of the present invention are described in Table I below:

TABLE I

Class (3) Hydrolases (enzymes functioning to catalyze the hydrolytic cleavage of various bonds including the bonds C—O, C—N, and C—C)
   3.1 - Enzymes Acting on Ester Bonds
      3.1.3 - Phosphoric monoester hydrolases
   3.2 - Glycosidases
      3.2.1.1 - α-Amylase
      3.2.1.2 - β-Amylase
      3.2.1.3 - Glucan 1,4-α-glucosidase
      3.2.1.4 - Cellulase
      3.2.1.11 - Dextranase
      3.2.1.20 - α-Glucosidase
      3.2.1.22 - α-Galactosidase
      3.2.1.25 - β-Mannosidase
      3.2.1.48 - Sucrase
      3.2.1.60 - Glucan 1,4-α-maltotetraohydrolase
      3.2.1.70 - Glucan 1,6-α-glucosidase
   3.4 - Enzymes Acting on Peptide Bonds (peptide hydrolases)
      3.4.22 - Cysteine proteinases
      3.4.22.2 - Papain
      3.4.22.3 - Fecin
      3.4.22.4 - Bromelin
Class (4) Lyases (enzymes cleaving C—C, C—O, C—N and other bonds by means other than hydrolysis or oxidation)
   4.1 - Carbon-carbon lyases
   4.2 - Carbon-oxygen lyases
   4.3 - Carbon-nitrogen lyases
Class (2) Transferases (enzymes transferring a group, for example, TABLE I-continued a methyl group or a glycosyl group, from one compound (donor) to another compound (acceptor)
   2.1 - Transferring one-carbon groups
      2.1.1 - Methyltransferases
   2.4 - Glycosyltransferases
      2.4.1.1 - Phosphorylase
Class (1) Oxidoreductases (enzymes catalyzing oxido-reductions)
   1.1 - Acting on the CH—OH group of donors
      1.1.1.47 glucose dehyogenase Table II below demonstrates examples of polymeric organic viscosifiers which may be present in drilling mud and examples of corresponding enzymes capable of rapidly degrading such viscosifiers.

TABLE II

Examples of Polymeric Organic Viscosifiers and Effective Enzymes for Rapidly Degrading the Same

| Polymeric Organic Viscosifier | Effective Enzyme(s) |
|---|---|
| Carboxymethylcellulose and Derivatives Thereof (CMC) | hemicellulase<br>cellulase<br>amyloglucosidase<br>α-amylase<br>β-amylase<br>glucan 1,4-α-glucosidase<br>glucan 1,6-α-glucosidase<br>cellulose 1,4-β-cellobiosidase |
| Hydroxyethylcellulose (HEC) | hemicellulase<br>cellulase<br>amyloglucosidase<br>cellulose 1,4-β-cellobiosidase |
| Guar Flour | hemicellulase<br>cellulase<br>amyloglucosidase<br>cellulose 1,4-β-cellobiosidase |
| Xanthan | glucosidase<br>glucan 1,4-α-glucosidase<br>glucan 1,6-α-glucosidase<br>α-glucosidase |
| Glucans | glucan 1,4-α-maltotetraohydrolase<br>glucan 1,4-α-glucosidase<br>cellulase |

The enzymes rapidly chemically react with and modify or degrade selective polymeric organic viscosifiers to eliminate or reduce the characteristics of the drilling mud (e.g., gel strength, viscosity) that the polymeric organic viscosifiers were added to increase. The resulting degradation or breakdown of the viscosifiers allows solids to settle out of the drilling mud in a mud pit or the viscosifiers and other components of the drilling mud to be washed out of the well. In downhole applications, the degraded polymeric organic viscosifiers typically remain with the thinned drilling mud and are discarded therewith by circulation or other means. The products remaining after the enzymatic degradation, e.g., glucose molecules and other short chain molecules, are more easily biodegraded.

Typically, the amount of enzyme(s) needed will be very low. Because of the small quantity typically required, it is usually desirable to admix the enzyme(s) with a carrier fluid and then add the carrier fluid to the drilling mud. The type of carrier fluid and concentration of enzyme(s) to use therein depends on many factors including the type of organic viscosifier(s) involved, the type of application, volume and consistency of the drilling mud, contact time, temperature, pH and the like. The type of carrier fluid and the temperature, pH and other properties of the fluid can be varied to maintain and enhance the activity of the enzyme(s)

and/or to bring the organic viscosifier(s) into a more receptive state for the enzyme(s) to function therein.

Generally, each enzyme will be admixed with the drilling mud in an amount in the range of from about 0.01% to about 2.0% by weight based on the weight of the corresponding polymeric organic viscosifier(s). In certain downhole applications, it may be necessary to use a higher concentration of enzyme(s) to compensate for high temperature conditions.

The pH of the drilling mud can be adjusted prior to or after the enzyme(s) are admixed therewith to the pH-active range of the enzyme(s) to allow the use of certain enzymes and/or to promote more effective polymeric organic viscosifier degradation. Similarly, the temperature of the drilling mud can be adjusted to allow the use of certain enzymes and/or to promote more effective polymeric organic viscosifier degradation. The enzyme(s) preferably substantially degrade the polymeric organic viscosifier(s) in the drilling mud within about 30 minutes. Most preferably, the enzyme(s) substantially degrade the polymeric organic viscosifiers in less than 15 minutes.

In a first aspect, the present invention provides a method and composition for cleaning up a well site drilling mud pit containing drilling mud, the drilling mud being of the type comprising solid materials including at least one polymeric organic viscosifier and water. The method of this aspect of the invention comprises the steps of admixing one or more enzymes capable of enzymatically degrading the polymeric organic viscosifier(s) with the drilling mud to degrade the polymeric organic viscosifier(s), and allowing settleable solid materials remaining in the drilling mud to gravitationally settle in the mud pit from the water. Degradation of the polymeric organic viscosifier(s) in the drilling mud allows for the easy and inexpensive removal of both solids and water from the mud pit. Water of sufficient purity to be returned to the environment can be recovered.

The enzyme or enzymes can be admixed with the drilling mud in the mud pit by sprinkling them on the surface of the mud and admixing them into the mud by any means. Preferably, however, the enzyme or enzymes are admixed with a carrier fluid and the carrier fluid is slurried throughout the mud. Use of a carrier fluid provides for a more uniform distribution and helps reduce the viscosity of the mud. The carrier fluid can be water or any solution that does not adversely affect the enzyme(s). The pH, temperature, mineral content and the like of the carrier fluid must not interfere with the activity of the enzyme(s). The enzyme containing carrier fluid can be admixed with the drilling mud by pumping or other means.

Once the polymeric organic viscosifier(s) are substantially degraded, settleable solids contained in the mud will rapidly settle out. The mud becomes much more amenable to relatively simple solids-handling procedures. If desired, fine solids remaining in the water phase of the mud can be removed by various techniques including filtration, centrifugation and evaporation.

The pH of drilling mud in a reserve pit is usually approximately neutral. If necessary, the method of the first aspect of the invention can further comprise the step of adjusting the pH of the drilling mud to a value in the pH-active range of the enzyme or enzymes employed. The pH of the drilling mud can be adjusted by addition of any environmentally acceptable alkali solution (e.g., sodium hydroxide) or acid solution (e.g., hydrochloric acid), that does not detrimentally affect the enzyme(s), thereto.

If necessary, the method of the first aspect of the invention can also comprise the step of adjusting the temperature of the drilling mud, preferably to a value in the range of from about 40° F. to about 120° F., more preferably to a value in the range of from about 55° F. to about 95° F. The temperature of the drilling mud can be adjusted by any means. Of course, the temperature of the drilling mud will vary depending on the time of year, time of day, etc.

Once settleable solid materials remaining in the drilling mud gravitationally settle and, if desired, fine solids are removed from the water, the water in the mud pit can be allowed to evaporate and the settled solids can be removed. Alternatively, the water in the mud pit can be recovered and either returned to the environment or used for other purposes including the formulation of additional drilling fluids. Because the organic viscosifier(s) have been degraded and solid materials have been removed, the water is generally of sufficient purity to be returned to the environment, e.g., to a lake, stream or river. If necessary, the pH of the water can be neutralized prior to release thereof.

Thus, well site drilling mud pits can be cleaned up without expensive and time consuming special solids separation equipment and techniques. The materials remaining in the mud pits after well completion can be easily disposed of in an environmentally safe manner. The remaining solids can be buried in the pit. If the mud was a heavily weighted mud (e.g., above 12 pounds per gallon), it may be desirable to recover the weighting solids in accordance with techniques known to those skilled in the art. This recovery process should generally be carried out prior to water separation.

In a second aspect, the present invention provides a method and composition for removing used drilling mud of the type comprising solid materials including at least one polymeric organic viscosifier from a well including the wellbore and/or portions of formations adjacent thereto (the well face). The method of this aspect of the invention comprises the steps of injecting a well treatment fluid comprising one or more enzymes capable of rapidly enzymatically degrading the polymeric organic viscosifier(s) into the well, allowing the enzyme(s) of the well treatment fluid to degrade the polymeric organic viscosifier(s) and the well treatment fluid to disperse the used drilling mud and recovering the well treatment fluid and used drilling mud from the well. Degradation of the polymeric organic viscosifier(s) in the drilling mud frees the other mud component(s) rendering the mud water dispersible and allowing it to be removed.

The method of the second aspect of the invention is particularly useful for removing used drilling mud from the wall of a bore and portions of the formation adjacent thereto during an overall method of drilling a well wherein a drill bit is advanced into the earth to form a bore therein, the drill bit is withdrawn from the bore, annular well casing having an outside diameter less than the diameter of the bore is placed in the bore and cement is placed between the wall of the bore and the casing. Prior to placing the cement between the wall of the bore and the casing, a well treatment fluid comprising one or more enzymes capable of rapidly enzymatically degrading the polymeric organic viscosifier(s) is injected into the well, the enzyme(s) of the well treatment fluid are allowed to degrade the polymeric organic viscosifier(s) allowing the well treatment fluid to disperse the used drilling mud and the well treatment fluid and used drilling mud are removed from the well. This removes left over filter cake from the wall of the bore allowing the casing cement to properly and uniformly bond thereto, removes drilling mud from ledges and cavities in the wall of the bore allowing the casing cement to uniformly fill the same and cleans up portions of formations adjacent to the wellbore allowing oil and/or gas to more easily flow into the wellbore.

The well treatment fluid can be injected into the well by any means. Preferably, the well treatment fluid is injected into the well and circulated therethrough by the same pumping system that was used to circulate the drilling mud in the first place. Because the enzyme or enzymes are selective, they become inert once the organic viscosifier(s) they can react with are degraded. Circulation of the well treatment fluid can be stopped at intervals to allow sufficient time for the enzyme(s) to act, if necessary. The well treatment fluid and residual drilling mud can be recovered from the formation by circulation of the well treatment fluid back up to the surface. The progress of the method can be determined as the method is carried out by monitoring the well treatment fluid to determine rheological properties of recovered mud and/or if free enzyme(s) are coming back to the surface.

Preferably, the well treatment fluid employed in the method of the second aspect of the present invention comprises the enzyme or enzymes capable of rapidly enzymatically degrading the polymeric organic viscosifier(s) and a carrier fluid. The carrier fluid can be water, salt water, a simple solid (e.g., bentonite, barite) water slurry having a density sufficient to contain well pressures or some other treatment fluid such as a conventional cement spacer fluid or the like. In some instances, it may be desirable to carry out the method of the second aspect of the invention prior to other treatment methods. Preferably, the carrier fluid is water.

Preferably, the well treatment fluid further comprises a pH modifying agent for modifying the pH of the well treatment fluid to a value in the pH-active range of the enzyme or enzymes employed. The pH modifying agent can be any environmentally acceptable alkali solution (e.g., sodium hydroxide) or acid solution (e.g., hydrochloric acid) that does not detrimentally affect the enzyme(s).

In order to facilitate degradation of the polymeric organic viscosifier(s) by the enzyme or enzymes employed, the temperature of the drilling mud in contact with the wall of the bore or in portions of formations adjacent thereto can be adjusted by circulating a pad of cooling fluid such as water through the well prior to injecting the well treatment fluid therein.

By removing used drilling mud from the wall of the bore and around the well face, the composition and method of the second aspect of the present invention facilitate other phases of the drilling process and increase ultimate production of oil and/or gas from producing formations. The enzyme or enzymes rapidly degrade the polymeric organic viscosifier(s) before harsh chemicals and/or conditions in the well or formation render the enzyme(s) inactive. The method and composition of the second aspect of the invention can be used in connection with both production and injection wells.

Thus, the present invention provides a means to effectively decompose used drilling mud allowing mud pits to be easily cleaned out and interfering residual mud to be removed from the well.

Although many polymer additives including a variety of polymeric organic viscosifiers may be present in the used mud, alteration of only one or some of the polymeric organic viscosifiers may be sufficient to allow the mud to be removed or for natural biodegration processes to decompose the mud.

The following Example is provided to further exemplify the invention.

EXAMPLE

This Example is presented to further illustrate the compositions and methods of the present invention.

Laboratory tests were conducted to determine the effectiveness of certain enzymes at rapidly and selectively degrading various polymeric organic viscosifiers of a type typically employed in drilling muds. Tests were conducted using both aqueous solutions of the polymeric organic viscosifiers by themselves and actual drilling muds containing some of the polymeric organic viscosifiers.

The individual polymeric organic viscosifiers tested were:
(a) a sodium salt of carboxymethylcellulose (CMC), sold by Drilling Specialties Co. as "Regular Dris-Pac ®";
(b) hydroxyethylcellulose (HEC), obtained from Hercules, Inc.;
(c) hydroxyethylcellulose (HEC), sold by Hercules, Inc., under the trademark "Natrosol ®";
(d) guar flour, obtained from Hercules, Inc.; and
(e) a special form of guar flour, sol Co., a division of N.L. Industries, under the trademark "Lo Loss ®".

The actual drilling muds used in the tests were:
(a) Base Mud I—a 3.5% attapulgite clay in fresh water, obtained from Drilling Specialties Co.;
(b) Base Mud III—a 3.5% attapulgite clay in 5% salt water, obtained from Drilling Specialties Co.

The concentration of the polymeric organic viscosifiers in the individual solutions and in the actual drilling muds varied. The aqueous solutions containing CMC and HEC by themselves employed 1% by weight of the organic viscosifier. The aqueous solutions containing guar flour by itself each employed 2% by weight of the corresponding guar flour. In the actual drilling muds tested, CMC and HEC were employed at concentrations of 1.5 pounds per barrel and guar flour was employed at a concentration of 2 pounds per barrel.

The enzymes tested were:
(a) Cellulase from Trichoderma viride 1,4-(1,3;1,4)-$\beta$-D-glucan 4-glucanhydrolase, EC 3.2.1.4
   Activity: ca. 0.5 U/mg lyophilisate (37° C., carboxymethylcellulose as substrate)
   Supplier: Boehringer-Mannheim Co.
(b) Hemicellulase crude from *Aspergillus niger* (also contains cellulase activity 0.080 U/mg).
   Activity: ca. 0.053 U/mg using a $\beta$-galactose dehydrogenase system and locust beam gum as substrate: one unit will liberate 1.0 $\mu$ mole of $\beta$-galactose from hemicellulose per hour at 37° C., pH 5.5.
(c) $\alpha$-Amylase, Type III-A: crude bacterial sample from *Bacillus subtilis*
   Activity: 50–100 U/mg (1,4-$\alpha$-D-glucan 4-glucanohydrolase EC No. 3.2.1.1): one unit will liberate 1 mg of maltose from starch in 3 minutes at 20° C., pH 6.9.
   Supplier: Sigma Chemical Co.

(d) Amyloglucosidase from Rhizopus mold.
Amyloglucosidase promotes hydrolysis of both α-1,4 and α-1,6 glucan linkages in polysaccharides to remove successive glucose units from the nonreducing ends of the chain. With soluble starch substrate, almost theoretical yields of glucose are obtained.
Supplier: Sigma Chemical Co.
(e) Pichia homogenate supernatant (PHS) from *Pichia pastoris* culture containing about 250 enzyme units (EU) of alcohol oxidase and 5000 EU of catalase per 25 mL of solution. Other enzymes and their concentrations in this solution are unknown.

This solution was prepared from a fermenter effluent containing yeast cells (*Pichia pastoris*) grown on methanol at a cell density concentration such as 100-120 grams biomass (dry weight)/liter. This effluent was homogenized at a pH of about 7.5 using a Dynomill TM Model KDL using a 0.6 liter vessel in a continuous operation at 5° to 30° C. using belt combination #3 and a flow of 20-30 mL/hr. The Pichia homogenate supernatant (PHS) was prepared by centrifuging the homogenized sample and separating off the desired cell-free supernatant.

Enzyme samples (a)–(d) were each employed in the form of an aqueous solution consisting of 1% by weight of the enzyme. The PHS solution was not diluted.

polymeric organic viscosifiers that were admixed with the actual drilling muds. The viscosities of the polymeric organic viscosifier solutions and muds were measured at room temperatures using a Brookfield viscosimeter.

In each test, the initial viscosity of the polymeric organic viscosifier solution or mud sample was first measured. The volumes of the polymeric organic viscosifier solutions and mud samples ranged from 20 to 40 mL. Next, from one to four mL's of the enzyme solution were added to the polymeric organic viscosifier solution or mud sample. After one minute, the sample was stirred and the viscosity was measured. The sample was then allowed to stand without stirring at room temperature until the next reading at which time the sample was restirred and the viscosity again determined. Additional viscosity measurements were made at 10 and 20 minute contact times. Because the primary purpose of the tests was to determine if rapid polymeric organic viscosifier degradation occurred, the viscosities of the samples were not measured after 20 minutes of contact time.

The enzymes were first tested on the CMC polymeric organic viscosifier ("Regular DrisPac ®") in solution by itself. Thereafter, the amyloglucosidase and PHS system were tested on the CMC ("Regular DrisPac ®") as admixed with the Base Mud I and Base Mud III. The results of these tests are shown by TABLE III below.

TABLE III

| Test No. | Enz.[1] | Enz. Amt. (mL.) | Sample | Sample Amt. (mL.) | Ini. | After 1 min. | After 10 min. | After 20 min. | % Red.[3] |
|---|---|---|---|---|---|---|---|---|---|
| | | | | | | | Viscosity (cp)[2] | | |
| | | | | | | | Effect of Enzymes on CMC | | |
| 1 | Amyl.[4] | 1 | CMC[5] | 20 | 62 | 47 | 43 | 42 | 32 |
| 2 | Hem.[6] | 1 | CMC[5] | 20 | 62 | 47 | 37 | 31 | 50 |
| 3 | PHS[7] | 1 | CMC[5] | 20 | 62 | 28 | 23 | 19 | 69 |
| 4 | Cell.[8] | 1 | CMC[5] | 20 | 62 | 26 | 18 | 14 | 77 |
| 5 | AGD[9] | 1 | CMC[5] | 20 | 62 | 24 | 13 | 9 | 85 |
| 6 | AGD[9] | 1 | BMI/CMC[10] | 30 | 1750 | 1610 | 700 | 550 | 69 |
| 7 | AGD[9] | 2 | BMI/CMC[10] | 30 | 1750 | 1370 | 390 | 285 | 84 |
| 8 | AGD[9] | 4 | BMI/CMC[10] | 30 | 1600 | 470 | 200 | 275 | 83 |
| 9 | AGD[9] | 1 | BMIII/CMC[11] | 20 | 120 | 53 | 29 | 24 | 80 |
| 10 | AGD[9] | 2 | BMIII/CMC[11] | 20 | 120 | 43 | 9 | 31 | 74 |
| 11 | AGD[9] | 4 | BMIII/CMC[11] | 20 | 120 | 22 | 6 | 28 | 77 |
| 12 | PHS[7] | 1 | BMIII/CMC[11] | 20 | 83 | 62 | 40 | 26 | 69 |
| 13 | PHS[7] | 2 | BMIII/CMC[11] | 20 | 83 | 56 | 24 | 24 | 71 |
| 14 | PHS[7] | 3 | BMIII/CMC[11] | 20 | 83 | 47 | 28 | 21 | 75 |
| 15 | PHS[7] | 4 | BMIII/CMC[11] | 20 | 83 | 28 | 18 | 13 | 84 |

[1]Except for the PHS solution, each enzyme was employed in the form of an aqueous solution consisting of 1% by weight of the enzyme. The PHS solution was employed in its pure form.
[2]Centipoises - measured at room temperature on a Brookfield Viscosimeter.
[3]The percent by which the viscosity was reduced from its initial value to its value after 20 minutes of enzyme contact time.
[4]α-Amylase, Type III-A, supplied by Sigma Chemical Co.
[5]Carboxymethylcellulose polymeric organic viscosifier sold by Drilling Specialties Co. under the trademark "Regular DrisPac ®" employed in the form of an aqueous solution consisting of 1% by weight of the polymer.
[6]Hemicellulase crude from *Aspergillus niger*.
[7]Pichia homogenate supernatant from *Pichia pastoris*.
[8]Cellulase from *Trichoderma veride* 1,4-(1,3;1,4)- -D-glucan 4-glucanohydrolase, EC 3.2.1.4
[9]Amyloglucosidase from Rhizopus mold.
[10]Base Mud I - a drilling mud comprising a 3.5% attapulgite clay in fresh water obtained from Drilling Specialties Co., having 1.5 pounds per barrel of carboxymethylcellulose ("Regular DrisPac ®") admixed therewith.
[11]Base Mud III - a drilling mud comprising a 3.5% attapulgite clay in 5% salt water obtained from Drilling Specialties Co., having 1.5 pounds per barrel of carboxymethylcellulose ("Regular DrisPac ®") admixed therewith.

The effectiveness of the enzyme solutions at degrading the various polymeric organic viscosifiers was determined by measuring the extent that the viscosity of the polymeric organic viscosifier solution or drilling mud was reduced after addition of the enzyme solution thereto. Although other factors are involved, the extent of viscosity reduction achieved is indicative of the extent of polymeric organic viscosifier degradation achieved.

Each of the five enzyme solutions was tested on each individual polymeric organic viscosifier solution. Some of the enzyme solutions were then tested on certain Table III shows that the Pichia homogenate supernatant (PHS) (Test No. 3), cellulase (Cell.) (Test No. 4) and amyloglucosidase (AGD) (Test No. 5) more effectively promoted degradation of the CMC organic viscosifier in solution than did amylase (Amyl.) (Test No. 1) and hemicellulase (Hem.) (Test No. 2). The PHS, Cell. and AGD substantially degraded the CMC organic viscosifier within one to ten minutes. Table III also shows that AGD was quite effective in degrading the CMC in the Base Mud I/CMC polymer and Base Mud III/CMC combinations (Test Nos. 6-11). In the tests of AGD on the CMC organic viscosifier admixed with Base Mud III. The results of these tests are shown by Table IV below.

TABLE IV

Effect of Enzymes on HEC

| Test No. | Enz.[1] | Enz. Amt. (mL.) | Sample | Sample Amt. (mL.) | Viscosity (cp)[2] Ini. | After 1 min. | After 10 min. | After 20 min. | % Red.[3] |
|---|---|---|---|---|---|---|---|---|---|
| 1 | Amyl.[4] | 1 | HEC[5] | 20 | 42 | 36 | 33 | 31 | 26 |
| 2 | Hem.[6] | 1 | HEC[5] | 20 | 42 | 25 | 12 | 8 | 81 |
| 3 | PHS[7] | 1 | HEC[5] | 20 | 42 | 35 | 19 | 14 | 67 |
| 4 | Cell.[8] | 1 | HEC[5] | 20 | 42 | 6 | 4 | 5 | 88 |
| 5 | AGD[9] | 1 | HEC[5] | 20 | 42 | 16 | 7 | 5 | 88 |
| 6 | Amyl.[4] | 1 | HEC[10] | 20 | 33 | 33 | 28 | 26 | 21 |
| 7 | Hem.[6] | 1 | HEC[10] | 20 | 33 | 25 | 11 | 6 | 82 |
| 8 | PHS[7] | 1 | HEC[10] | 20 | 33 | 30 | 17 | 13 | 61 |
| 9 | Cell.[8] | 1 | HEC[10] | 20 | 33 | 8 | 3 | 3 | 91 |
| 10 | AGD[9] | 1 | HEC[10] | 20 | 33 | 14 | 5 | 4 | 88 |
| 11 | Amyl.[4] | 1 | BMI/HEC[11] | 20 | 44 | 29 | 37 | 35 | 20 |
| 12 | Hem.[6] | 1 | BMI/HEC[11] | 20 | 44 | 40 | 27 | 37 | 16 |
| 13 | PHS[7] | 1 | BMI/HEC[11] | 20 | 44 | 40 | 24 | 13 | 70 |
| 14 | Cell.[8] | 1 | BMI/HEC[11] | 20 | 44 | 35 | 34 | 35 | 20 |
| 15 | AGD[9] | 1 | BMI/HEC[11] | 20 | 44 | 34 | 26 | 30 | 32 |
| 16 | Amyl.[4] | 1 | BMIII/HEC[12] | 20 | 180 | 129 | 124 | 128 | 29 |
| 17 | Hem.[6] | 1 | BMIII/HEC[12] | 20 | 180 | 142 | 72 | 93 | 48 |
| 18 | PHS[7] | 1 | BMIII/HEC[12] | 20 | 180 | 151 | 112 | 84 | 53 |
| 19 | Cell.[8] | 1 | BMIII/HEC[12] | 20 | 180 | 129 | 68 | 66 | 63 |
| 20 | AGD[9] | 1 | BMIII/HEC[12] | 20 | 180 | 118 | 23 | 14 | 92 |

[1]Except for the PHS solution, each enzyme was employed in the form of an aqueous solution consisting of 1% by weight of the enzyme. The PHS solution was employed in its pure form.
[2]Centipoises - measured at room temperature on a Brookfield Viscosimeter.
[3]The percent by which the viscosity was reduced from its initial value to its value after 20 minutes of enzyme contact time.
[4]α-Amylase, Type III-A, supplied by Sigma Chemical Co.
[5]Hydroxyethylcellulose obtained from Hercules, Inc. - employed in the form of an aqueous solution consisting of 1% by weight of the polymeric organic viscosifier.
[6]Hemicellulase crude from *Aspergillus niger*.
[7]Pichia homogenate supernatant from *Pichia pastoris*.
[8]Cellulase from *Trichoderma viride* 1,4-(1,3;1,4)-β-D-glucan 4-glucanohydrolase, EC 3.2.1.4
[9]Amyloglucosidase from Rhizopus mold.
[10]Hydroxyethylcellulose ("Natrosol ®") - employed in the form of an aqueous solution consisting of 1% by weight of the polymeric organic viscosifier.
[11]Base Mud I - a drilling mud comprising a 3.5% attapulgite clay in fresh water obtained from Drilling Specialties Co., having 1.5 pounds per barrel of HEC ("Natrosol ®") admixed therewith.
[12]Base Mud III - a drilling mud comprising a 3.5% attapulgite clay in 5% salt water obtained from Drilling Specialties Co., having 1.5 pounds per barrel of HEC ("Natrosol ®") admixed therewith.

with Base Mud I, the viscosity decreased as the enzyme concentration increased. As exposure time increased the viscosity changes achieved by the different concentrations of AGD approached each other indicating only the rate of degradation changed but not the degree of such degradation. Similar results were obtained in the tests of AGD on the CMC admixed with Base Mud III, but the effect of increasing the concentration of the enzyme was observed to a lesser extent. This indicates that even lower concentrations of the AGD would be just as effective.

The effectiveness of the PHS in degrading the CMC is somewhat surprising. In addition to very effectively degrading the CMC in solution, the PHS effectively degraded the CMC in the Base Mud III/CMC combinations (Test Nos. 12-15). The effectiveness of the PHS is surprising because the known enzymes present therein, i.e., alcohol oxidase, catalase and formate dehydrogenase, would not normally be expected to promote degradation of the CMC polymeric organic viscosifier.

Next, the five enzyme solutions were tested on the HEC polymeric organic viscosifier obtained from Hercules, Inc. the HEC polymeric organic viscosifier ("Natrosol ®"), the HEC ("Natrosol ®") as admixed with Base Mud I and the HEC ("Natrosol ®") as admixed Table IV shows that hemicellulase (Hem.), cellulase (Cell.) and amyloglucosidase (AGD) promoted degradation of both the HEC polymeric organic viscosifier obtained from Hercules, Inc. and the HEC ("Natrosol ®") in solution more effectively than did the amylase (Amyl.) and the Pichia homogenate supernatant (PHS). The tests clearly show that hydroxyethylcellulose is readily susceptible to enzymatic degradation by specific enzyme solutions.

Test Nos. 11-15 indicate that Amyl., Hem., Cell. and AGD were inhibited by Base Mud I (fresh water mud). The effectiveness of PHS in promoting degradation of the HEC ("Natrosol ®") in the Base Mud I/HEC ("Natrosol ®") combination (Test No. 13), as well as in the HEC in solution (Test Nos. 3 and 8) is surprising. The AGD was clearly the most effective in promoting degradation of the HEC ("Natrosol ®") in the Base Mud II (salt water mud)/HEC ("Natrosol ®") combination. The test results indicate that the other enzymes were somewhat inhibited by the salt water mud.

Next, the five enzyme solutions were tested on the guar flour obtained from Hercules, Inc., the guar flour ("Lo Loss ®"), the guar flour ("Lo Loss ®") as admixed with Base Mud I and the guar flour ("Lo Loss ®") as admixed with Base Mud III. The results of these tests are shown by Table V below.

TABLE V

Effect of Enzymes on Guar Flour

| Test No. | Enz.[1] | Enz. Amt. (mL.) | Sample | Sample Amt. (mL.) | Viscosity (cp)[2] Ini. | After 1 min. | After 10 min. | After 20 min. | % Red.[3] |
|---|---|---|---|---|---|---|---|---|---|
| 1 | Amyl.[4] | 1 | GF[5] | 20 | 49 | 40 | 37 | 35 | 29 |

TABLE V-continued

Effect of Enzymes on Guar Flour

| Test No. | Enz.[1] | Enz. Amt. (mL.) | Sample | Sample Amt. (mL.) | Viscosity (cp)[2] | | | | % Red.[3] |
|---|---|---|---|---|---|---|---|---|---|
| | | | | | Ini. | After 1 min. | After 10 min. | After 20 min. | |
| 2 | Hem.[6] | 1 | GF[5] | 20 | 49 | 23 | 9 | 8 | 84 |
| 3 | PHS[7] | 1 | GF[5] | 20 | 49 | 45 | 43 | 42 | 14 |
| 4 | Cell.[8] | 1 | GF[5] | 20 | 49 | 13 | 8 | 5 | 90 |
| 5 | AGD[9] | 1 | GF[5] | 20 | 49 | 39 | 36 | 34 | 31 |
| 6 | Amyl.[4] | 1 | GF[10] | 20 | 48 | 46 | 32 | 39 | 19 |
| 7 | Hem.[6] | 1 | GF[10] | 20 | 48 | 13 | 8 | 4 | 92 |
| 8 | PHS[7] | 1 | GF[10] | 20 | 48 | 47 | 46 | 44 | 8 |
| 9 | Cell.[8] | 1 | GF[10] | 20 | 48 | 26 | 7 | 6 | 88 |
| 10 | Amyl.[9] | 1 | GF[10] | 20 | 48 | 45 | 29 | 27 | 44 |
| 11 | Cell.[8] | 2 | BMI/GF[11] | 40 | 470 | 325 | 320 | 310 | 34 |
| 12 | Hem.[6] | 2 | BMI/GF[11] | 40 | 470 | 325 | 315 | 305 | 35 |
| 13 | Cell./Hem.[12] | 4[13] | BMI/GF[11] | 40 | 470 | 225 | 245 | 275 | 41 |
| 14 | Cell.[8] | 2 | BMIII/GF[14] | 40 | 1525 | 1030 | 875 | 850 | 44 |
| 15 | Hem.[6] | 2 | BMIII/GF[14] | 40 | 1525 | 1035 | 1020 | 1000 | 34 |
| 16 | Cell./Hem.[12] | 3[15] | BMIII/GF[14] | 40 | 1525 | 930 | 820 | 770 | 50 |

[1]Except for the PHS solution, each enzyme was employed in the form of an aqueous solution consisting of 1% by weight of the enzyme. The PHS solution was employed in its pure form.
[2]Centipoises - measured at room temperature on a Brookfield Viscosimeter.
[3]The percent by which the viscosity was reduced from its initial value to its value after 20 minutes of enzyme contact time.
[4]α-Amylase, Type III-A, supplied by Sigma Chemical Co.
[5]Guar Flour obtained from Hercules, Inc. employed in the form of an aqueous soluion consisting of 2% by weight of the polymeric organic viscosifier.
[6]Hemicellulase crude from *Aspergillus niger*.
[7]Pichia homogenate supernatant from *Pichia pastoris*.
[8]Cellulase from *Trichoderma viride* 1,4-(1,3;1,4)-β-D-glucan 4-glucanohydrolase, EC 3.2.1.4
[9]Amyloglucosidase from Rhizopus mold.
[10]Guar flour ("Lo Loss ®") - employed in the form of an aqueous solution consisting of 2% by weight of the polymeric organic viscosifier.
[11]Base Mud I - a drilling mud comprising a 3.5% attapulgite clay in fresh water obtained from Drilling Specialties Co., having 2 pounds per barrel of guar flour ("Lo Loss ®") admixed therewith.
[12]A blend of a solution (1% by wt.) of cellulase (from *Trichoderma viride* 1,4-(1,3:1,4)-β-D-glucan 4-glucanhydrolase) and a solution (1% by weight) of hemicellulase (crude from *Aspergillus niger*).
[13]The blend consisted of 2 mL of each enzyme.
[14]Base Mud III - a drilling mud comprising a 3.5% attapulfite clay in 5% salt water obtained from Drilling Specialties Co., having 2 pounds per barrel of guar flour ("Lo Loss ®") admixed therewith.
[15]The blend consisted of 2 mL of the cellulase and 1 mL of the hemicellulase.

Table V shows that hemicellulase (Hem.) and cellulase (Cell.) rapidly degraded both the guar flour obtained from Hercules, Inc. and the guar flour ("Lo Loss ®"). The lack of ability of the other enzymes to degrade the guar flour polymeric organic viscosifiers demonstrates the selective action of the enzymes. It is possible to remove only one or some of two or more polymeric organic viscosifiers in a particular drilling mud allowing various treatment scenarios to be employed. The amyloglucosidase (AGD) appeared to more effectively degrade the "Lo Loss ®" guar flour (Test No. 10) than the guar flour obtained from Hercules, Inc. (Test No. 5) showing that enzymes can be used to selectively degrade different forms of the same type of polymeric organic viscosifier.

The Cell., Hem. and blends thereof were not as effective in degrading the guar flour ("Lo Loss ®") in the Base Mud I/"Lo Loss ®" and Base Mud II/"Lo Loss ®" combinations. It is possible that the clay in the drilling muds inhibits reaction of the enzymes on this polymeric organic viscosifier. The fact that the polymeric organic viscosifiers were not any more effective when blended together than when used alone indicates that both enzymes attack the same portions of the polymer structure.

Thus, enzymes can be effectively used at low concentrations to rapidly degrade polymeric organic viscosifiers of the type used in drilling muds. The degradation achieved by the enzymes is rapid (usually less than ten minutes) which allows use of the enzymes in environments where harsh conditions would otherwise rapidly cause their inactivation. The enzymes employed in the tests were selected on the basis of availability. Other enzymes or enzyme systems can be employed for greater effectiveness and various degrees of selectivity.

The preceding examples can be repeated with similar success by substituting the generically or specifically described reactants and/or operating conditions of this invention for those used in the examples.

Although certain preferred embodiments of the invention have been described for illustrative purposes, various modifications and innovations of the compositions and methods recited herein may be effected without departure from the basic principles which underlie the invention. Changes of this type are deemed to lie within the spirit and scope of the invention except as may be necessarily limited by the appended claims and reasonable equivalents thereof.

We claim:

1. A method of removing used drilling mud of the type comprising solid materials including at least one polymeric organic viscosifier from a wellbore and portions of formations adjacent thereto comprising:
   injecting a well treatment fluid comprising an enzyme capable of rapidly enzymatically degrading said polymeric organic viscosifier into said well; and
   allowing said enzyme to degrade said polymeric organic viscosifier and said well treatment fluid to disperse said used drilling mud.

2. The method of claim 1 further comprising the step of after allowing said enzyme to degrade said polymeric organic viscosifier and said well treatment fluid to disperse said used drilling mud, recovering said well treatment fluid and used drilling mud from said well.

3. The method of claim 1 wherein said well treatment fluid further comprises a pH modifying agent for modifying the pH of said well treatment fluid to a value in the pH-active range of said enzyme.

4. The method of claim 1 wherein said enzyme is present in said well treatment fluid in an amount in the range of from about 0.01% to about 2% by weight based on the weight of said polymeric organic viscosifier.

5. The method of claim 1 wherein said polymeric organic viscosifier is selected from the group of carboxymethylcellulose and derivatives of carboxymethylcellulose, and said enzyme is selected from the group of hemicellulase, cellulase, amyloglucosidase, $\alpha$-amylase, $\beta$-amylase, glucan 1,4-$\alpha$-glucosidase, glucan 1,6-$\beta$-glucosidase, and cellulose 1,4-$\beta$-cellobiosidase.

6. The method of claim 1 wherein said polymeric organic viscosifier is hydroxyethylcellulose, and said enzyme is selected from the group of hemicellulase, cellulase, amyloglucosidase, and cellulose 1,4-$\beta$-cellobiosidase.

7. The method of claim 1 wherein said polymeric organic viscosifier is guar flour, and said enzyme is selected from the group of hemicellulase, cellulase, amyloglucosidase, and cellulose 1,4-$\beta$-cellobiosidase.

8. The method of claim 1 wherein said polymeric organic viscosifier is xanthan, and said enzyme is selected from the group consisting of glucosidase, glucan 1,4-$\alpha$-glucosidase, glucan 1,6-$\alpha$-glucosidase and $\alpha$-glucosidase.

9. The method of claim 1 wherein said polymeric organic viscosifier is a glucan, and said enzyme is selected from the group of glucan 1,4-$\alpha$-maltotetraohydrolase, glucan 1,4-$\alpha$-glucosidase and cellulase.

10. In a method of drilling a well wherein a drill bit is advanced into the earth to form a bore therein, the drill bit is withdrawn from the bore, annular well casing having an outside diameter less than the diameter of the bore is placed in the bore and cement is placed between the wall of the bore and the casing, the improvement comprising:
    prior to placing the cement between the wall of the bore and the casing, injecting a well treatment fluid into said well to remove used drilling mud of the type comprising solid materials including at least one polymeric organic viscosifier therefrom, said well treatment fluid comprising an enzyme capable of rapidly enzymatically degrading said polymeric organic viscosifier; and
    allowing said enzyme to degrade said polymeric organic viscosifier and said well treatment fluid to disperse said used drilling mud.

11. The method of claim 10 further comprising the step of after allowing said enzyme to degrade said polymeric organic viscosifier and said well treatment fluid to disperse said used drilling mud, recovering said well treatment fluid and used drilling mud from said well.

12. The method of claim 10 wherein said well treatment fluid further comprises a pH modifying agent for modifying the pH of said well treatment fluid to a value in the pH-active range of said enzyme.

13. The method of claim 10 wherein said enzyme is present in said well treatment fluid in an amount in the range of from about 0.01% to about 2% by weight based on the weight of said polymeric organic viscosifier.

14. The method of claim 10 wherein said polymeric organic viscosifier is selected from the group of carboxymethylcellulose and derivatives of carboxymethylcellulose, and said enzyme is selected from the group of hemicellulase, cellulase, amyloglucosidase, $\alpha$-amylase, $\beta$-amylase glucan 1,4-$\alpha$-glucosidase, glucan 1,6-$\alpha$-glucosidase, and cellulose 1,4-$\beta$-cellobiosidase.

15. The method of claim 10 wherein said polymeric organic viscosifier is hydroxyethylcellulose, and said enzyme is selected from the group of hemicellulase, cellulase, amyloglucosidase, and cellulose 1,4-$\beta$-cellobiosidase.

16. The method of claim 10 wherein said polymeric organic viscosifier is guar flour, and said enzyme is selected from the group of hemicellulase, cellulase, amyloglucosidase, and cellulose 1,4-$\beta$-cellobiosidase.

17. The method of claim 10 wherein said polymeric organic viscosifier is xanthan, and said enzyme is selected from the group consisting of glucosidase, glucan 1,4-$\alpha$-glycosidase, glucan 1,6-$\alpha$-glucosidase and $\alpha$-glucosidase.

18. The method of claim 10 wherein said polymeric organic viscosifier is a glucan, and said enzyme is selected from the group of glucan 1,4-$\alpha$-maltotetraohydrolase, glucan 1,4-$\alpha$-glucosidase and cellulase.

* * * * *

UNITED STATES PATENT AND TRADEMARK OFFICE
CERTIFICATE OF CORRECTION

PATENT NO. : 5,165,477
DATED : November 24, 1992
INVENTOR(S) : Francis J. Shell and Donald O. Hitzman It is certified that error appears in the above-identified patent and that said Letters Patent is hereby corrected as shown below:

Column 10, line 33, delete the word "sol" and substitute the words --sold by Baroid-- therefor;

Column 14, line 54, delete "II" and substitute --III-- therefor;

In footnote 14 to Table V (Columns 15 and 16), delete "attapulfite" and substitute --attapulgite-- therefor;

Column 17, lines 8 and 9, delete "1,6-$\beta$-glucosidase" and substitute --1,6-$\alpha$-glucosidase-- therefor; and Column 18, line 23, insert a comma between "$\beta$-amylase" and "glucan 1,4-$\alpha$-glucosidase".

Signed and Sealed this

Fifth Day of October, 1993

Attest:

BRUCE LEHMAN

Attesting Officer

Commissioner of Patents and Trademarks